(12) United States Patent
Meng

(10) Patent No.: US 7,657,260 B2
(45) Date of Patent: Feb. 2, 2010

(54) METHOD OF PROVIDING DATA REDUNDANCY FOR HOME LOCATION REGISTER

(75) Inventor: Guangbin Meng, Guangdong (CN)

(73) Assignee: Huawei Technologies, Co., Ltd., Shenzhen, Guangdong (CN)

( * ) Notice: Subject to any disclaimer, the term of this patent is extended or adjusted under 35 U.S.C. 154(b) by 504 days.

(21) Appl. No.: 11/431,890

(22) Filed: May 10, 2006

(65) Prior Publication Data

US 2006/0246894 A1 Nov. 2, 2006

Related U.S. Application Data

(63) Continuation-in-part of application No. PCT/CN2004/001274, filed on Nov. 9, 2004.

(30) Foreign Application Priority Data

Nov. 10, 2003 (CN) .................. 2003 1 0113268

(51) Int. Cl.
 *H04W 4/00* (2006.01)
(52) U.S. Cl. .................... 455/433; 455/456.1; 455/461; 370/338
(58) Field of Classification Search ............... 455/456.1, 455/445, 435.1, 414.2, 412.1, 428, 423, 433, 455/67.14, 432, 434, 461; 370/227, 230, 370/328, 338, 400, 401, 465, 419, 463, 331; 714/3, 6, 11, 13
See application file for complete search history.

(56) References Cited

U.S. PATENT DOCUMENTS

| | | | |
|---|---|---|---|
| 5,623,532 A * | 4/1997 | Houde et al. ................. | 455/445 |
| H1897 H * | 10/2000 | Fletcher et al. .............. | 455/433 |
| 6,718,173 B1 * | 4/2004 | Somani et al. ........... | 455/456.1 |
| 6,807,623 B2 * | 10/2004 | Migita et al. ................. | 712/214 |
| 7,039,402 B1 * | 5/2006 | Gan et al. .................... | 455/433 |

(Continued)

FOREIGN PATENT DOCUMENTS

EP 0 959 637 A2 11/1999

(Continued)

OTHER PUBLICATIONS

International Search Report for International Application No. PCT/CN2004/001274, mailed Feb. 3, 2005.

(Continued)

*Primary Examiner*—Dwayne Bost
*Assistant Examiner*—Inder P Mehra
(74) *Attorney, Agent, or Firm*—Darby & Darby P.C.

(57) ABSTRACT

The present invention discloses a method of providing data redundancy for HLR, the method comprises: performing cutover for subscribers' data preserved in master HLRs into a redundant center HLR; preserving all successfully executed operation & maintenance commands which are associated with system data and said subscribers' data of the master HLRs during runtime of the master HLRs; transferring said operation & maintenance commands preserved in the master HLRs to the redundant center HLR; converting the received operation & maintenance commands into internal operation commands recognizable by the redundant center HLR, and loading them into a host machine of the redundant center HLR. The present invention enhances the conformity of the subscribers' data, and reduces the maintenance workload of the redundant center HLR and lowers the maintenance complexity.

12 Claims, 2 Drawing Sheets

U.S. PATENT DOCUMENTS

2002/0029298 A1* 3/2002 Wilson .................. 709/316
2002/0131436 A1* 9/2002 Suri ..................... 370/419
2004/0152459 A1* 8/2004 Dysart ................... 455/423
2005/0081095 A1   4/2005 Wang et al.
2009/0264162 A1* 10/2009 Ramachandran et al. .... 455/572

FOREIGN PATENT DOCUMENTS

WO    WO00/24216 A    4/2000

OTHER PUBLICATIONS

English translation of foreign counterpart Japanese Application No. 2006-538637 Office Action mailed Jul. 15, 2008.
Brief explanation and English abstract of Japanese Patent Application No. H04-216145.
English translation of Japanese Patent Application No. H11-331920.
English translation of Japanese Patent Application No. 2000-152315.
English translation of Japanese Patent Application No. 2001-142763.

* cited by examiner

METHOD OF PROVIDING DATA REDUNDANCY FOR HOME LOCATION REGISTER

CROSS-REFERENCE TO RELATED APPLICATIONS

This application is a continuation-in-part of PCT Application No. PCT/CN2004/001274, filed Nov. 9, 2004, pending, which designates the U.S., which is hereby incorporated herein by reference in its entirety, and which claims priority from Chinese Application No. 200310113268.8, filed Nov. 10, 2003.

FIELD OF THE TECHNOLOGY

The present invention relates to a method of providing data redundancy for Home Location Register (HLR) in mobile communication system.

BACKGROUND OF THE INVENTION

With rapid growth of mobile subscribers and incessant development of communication techniques, the unit capacity of single HLR in mobile communication system has reached tens of thousands or even more. Since HLRs have stored subscription information of mobile subscribers, mobile services for all the subscribers will cease when the HLRs fail for a long period of time due to unforeseeable causes such as power failure, fire, earthquake or lightning strike, etc. Therefore, it is urgent to provide remote redundancy for the HLRs.

The redundancy for HLRs includes two aspects, one aspect is data redundancy simply for backup subscribers' data, the other is service redundancy which is based on the former aspect, i.e., when a master HLR breaks down, a redundant HLR is able to take over the services by means of signaling switchover according to the backup subscribers' data, so as to prevent the calling services from being interrupted at a maximum level.

The topology structures of data redundancy for HLRs are classified into two types. One is 1+1 redundancy solution, and the other is N+1 redundancy solution.

The so-called 1+1 redundancy solution is to provide a redundant HLR for each master HLR in the existing network so as to achieve real-time backup for external services. Though the 1+1 redundancy solution is able to take over the services seamlessly by adopting the redundant HLR when the master HLR fails, apart from some extremely important places, the application field of this solution is relatively limited in consequence of its high investment and low rate of utilization.

The N+1 redundancy solution is to set up a special redundant center HLR for providing redundancy for N master HLRs. In the N+1 redundancy solution, the redundancy can be further divided into compatible redundancy and non-compatible redundancy according to the result whether the master HLRs and the redundant center HLR belong to the same manufacturer. Because there are many HLR equipment providers, and different HLRs have different data saving formats and data processing methods, the compatible solution is more widely used. Since the N+1 compatible redundancy solution is unable to back up subscribers' dynamic data in real time, it will lead to the situation that the subscribers cannot act as the called party in a period of time after a failure has appeared and the services have been taken over. However, as one redundant center is able to back up data for a plurality of master HLRs made by different manufacturers, the return rate on investment of the N+1 compatible redundancy solution is relatively better, thus this solution is broadly adapted in the network.

At present, the N+1 compatible redundancy solution mainly has two types, one is a baseline synchronization solution, and the other is a BOSS (Business Operation Support System) increased command synchronization solution.

What is called the baseline synchronization solution is to output the data files containing all subscribers' subscription information, i.e., the service data baseline of subscriber, by the master HLRs periodically, then convert the format of these files automatically by the redundant center into the format recognizable by the redundant center HLR, and load the files into the redundant center HLR. Thereby, it will realize the synchronization of subscribers' data between the master HLRs and the redundant center HLR. As the baseline synchronization solution requires the master HLRs to output the service data baseline of all subscribers periodically, performance of the host machine of the redundant center HLR is affected greatly, and it takes quite a long time to perform conversion and synchronization for the subscribers' data, it is seldom used in practical engineering.

The BOSS increased command synchronization solution is to convert the successfully executed business operation commands which were formerly sent to the master HLRs for modifying the subscribers' subscription data according to the interface format of the redundant center HLR, and load the commands into the host machine in real time via the business operation interface of the host machine of the redundant center HLR. Thus, as long as the master HLRs and the redundant center HLR implement baseline synchronization for one time in initial state, the conformity of the subscribers' data between the master HLRs and the redundant center HLR will be guaranteed by means of this way to achieve the synchronization of the subsequent increased command or data.

Since the BOSS solution does not have any special requirements on the performance and function of the host machine of the redundant center HLR, and only needs to add converting function for operation commands of different manufacturers' formats in the BOSS, this solution is simple and is low cost because of low engineering work required. Therefore, the solution is widely used in the network and has gradually turned into a mainstream of N+1 redundancy solution.

However, only operation commands processed by the business hall can be synchronized automatically by the BOSS solution, a large number of other operation commands processed out of the business hall, such as the operation commands for setting a batch of subscriber services in a Local Maintenance Terminal (LMT) of HLR, and setting parameters of HLR in the system level, can merely be synchronized manually by the administrator in terms of the procedure. Therefore, the maintenance workload of this solution is heavy.

SUMMARY OF THE INVENTION

In view of the above, the present invention is to provide a data redundancy method for HLR, to ensure the conformity of the subscribers' data between the master HLRs and the redundant center HLR, and reduce the maintenance workload of the redundant center HLR.

The technical scheme in accordance with the present invention is achieved as follows:

A method of providing data redundancy for Home Location Register (HLR), comprising the steps of:

performing cutover for subscribers' data preserved in master HLRs into a redundant center HLR;

preserving all successfully executed operation & maintenance commands which are associated with system data and said subscribers' data of the master HLRs during runtime of the master HLRs;

transferring said operation & maintenance commands preserved in the master HLRs to the redundant center HLR;

converting the operation & maintenance commands into internal operation commands recognizable by the redundant center HLR, and loading the internal operation commands into a host machine of the redundant center HLR.

Here, said method of performing cutover for subscribers' data comprises: performing cutover for the subscribers' data from more than one master HLRs to the redundant center HLR, respectively.

The method may further comprise: setting a distinct master HLR identity for each of the master HLRs, respectively; and adding the master HLR identities to the subscribers' data and the received operation & maintenance commands by the redundant center HLR;

said performing cutover for the subscribers' data comprises: loading the subscribers' data from different master HLRs to the host machine of the redundant center HLR according to the different master HLR identities, respectively;

said converting and loading the commands comprises: reserving the master HLR identities when converting operation & maintenance commands by the redundant center HLR, and loading the converted internal operation commands, respectively, into the host machine of the redundant center HLR in terms of the different master HLR identities.

The operation & maintenance commands in the master HLRs are preserved as log files;

and said transferring the operation & maintenance commands comprises transferring the log files containing the operation & maintenance commands.

The method of transferring the operation & maintenance commands may comprise: the redundant center HLR periodically fetches the log files containing the operation & maintenance commands from the open list of the master HLR.

The method of transferring the operation & maintenance commands may also comprise: the redundant center HLR gives an instruction to the master HLR for transferring the operation & maintenance commands, the master HLR gets the log files saved in itself after receiving the instruction, and returns the log files to the redundant center HLR.

The method of converting the operation & maintenance commands may comprise: analyzing the received log file containing the operation & maintenance commands, and converting the operation & maintenance commands into the internal operation commands recognizable by the redundant center HLR according to operated subscriber number, type of the operation command, operation content and operating result in the log file.

The master HLRs and the redundant center HLR may transfer said operation & maintenance commands via a Wide Area Network (WAN).

The master HLRs and the redundant center HLR may transfer said operation & maintenance commands via a Digital Data Network (DDN), or in a X.25 Protocol mode, or in a E1 mode, but not limited to the above modes.

The master HLRs and the redundant center HLR may transfer said operation & maintenance commands in a File Transfer Protocol (FTP) or a SCOKET mode, but not limited to the above modes.

As seen from the technical scheme of the present invention which is a method of providing data redundancy for HLR, the redundant center HLR obtains all the successfully executed operation & maintenance commands which are associated with system data and subscribers' data of the master HLRs, converts them into internal operation commands recognizable by the redundant center, and loads them directly into the redundant center. Thus, the synchronization of all operation & maintenance commands between the redundant center HLR and the master HLRs can be reached, and the conformity of subscribers' data between the master HLRs and the redundant center HLR is obtained. In addition, the manual synchronization carried out by the administrator of the redundant center is no longer needed, and it reduces the maintenance workload of the redundant center HLR, and lowers the maintenance complexity.

EMBODIMENTS OF THE INVENTION

In order to make the technical solutions and merits of this invention clearer, a further detailed description of the invention is given hereinafter with reference to accompanying drawings.

The embodiment of the present invention for providing a data redundancy method in the HLR is: setting up a redundant center HLR corresponding to master HLRs which are in need of data redundancy, then recording operation & maintenance commands associated with subscribers' data and system data of each master HLR and synchronizing the data to the redundant center HLR, so as to achieve data conformity between the master HLRs and the redundant center HLR. The present embodiment aims at the N+1 redundancy mode, but it is also applicable for the 1+1 redundancy mode. The only difference lies in that there are multiple master HLRs in the N+1 mode, while there is solely one master HLR in the 1+1 mode.

The embodiment is explained in detail in the following, which obtains conformity for subscribers' data between the master HLRs and the redundant center HLR by means of synchronizing the operation logs of multiple master HLRs.

In order to meet the requirement of daily maintenance, function of outputting an operation log is basically supported by HLRs in the network, that is the HLRs can preserve all operation & maintenance commands issued by administrators in a mode of operation log with detailed operation content, which are associated with system data and subscribers' data of the master HLRs and are executed successfully, including the operations carried out via a business hall interface and a Local Maintenance Terminal. The operation logs of different manufactures differ from each other, but the format of the HLR maintenance log of certain manufacture is relatively fixed, and no matter what format the manufacturers adopt for the log, the basic elements are the same, which include operated subscriber number, such as Mobile Directory Number (MDN) and International Mobile Subscriber Identity (IMSI), type of the operation command, operation content and operating result, etc. Therefore, the logs of fixed format can be loaded directly into the redundant center as long as they are converted into a uniform format recognizable by the redundant center HLR.

In this way, all the operation & maintenance commands associated with the master HLRs can be synchronized between the master HLRs and the redundant center HLR, thereby automatic synchronization of all static data between the master HLRs and the redundant center HLR will be implemented and the complexity for maintaining the redundancy system is reduced.

Figure 1:
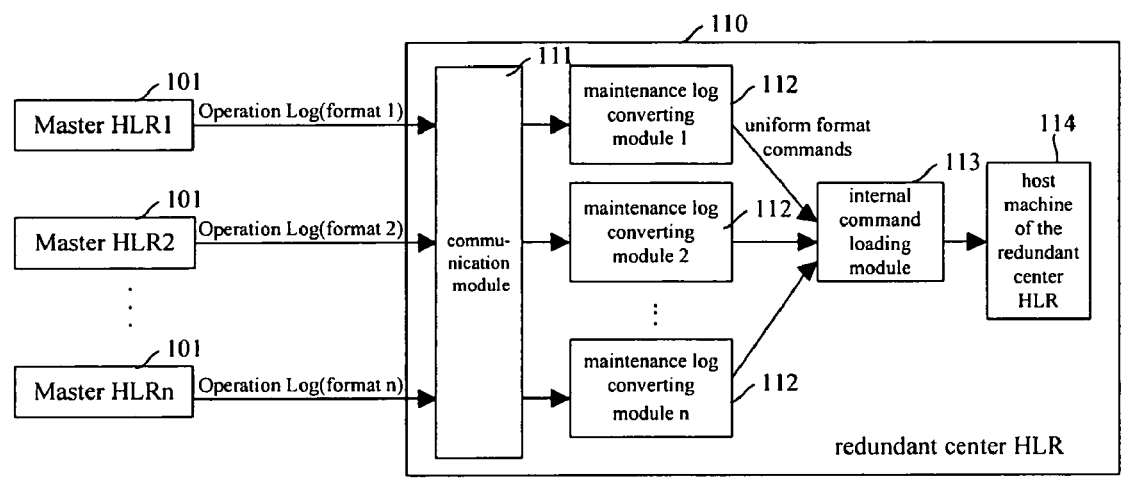
FIG. 1 is a schematic of a preferred embodiment of the present invention illustrating the implementing structure of the data redundancy method.

Referring to FIG. 1, which is a schematic of a preferred embodiment of the present invention illustrating the implementing structure of the data redundancy method, the N+1 redundancy mode is introduced in this embodiment. In the embodiment, all the master HLRs 101 are modified based on the original maintenance log output system, and all successfully executed operation & maintenance commands in regard to system data and subscribers' data of the master HLRs are saved in the mode of log file under a designated list. To meet the requirements of daily maintenance, all of the HLRs provided by different manufacturers in the network can support the function for outputting log files, thus the implementation of the embodiment is comparatively simple.

The redundant center HLR 110 of this embodiment is modified on the basis of a general HLR. Besides a host machine 114 of the redundant center HLR, a communication module 111, maintenance log converting modules 112 the amount of which is the same as that of the master HLRs, and an internal command loading module 113 are added extensively in the redundant center HLR. Then, perform cutover for the subscribers' data from every master HLR 101 respectively in advance to the host machine of the redundant center HLR 110 before the redundant center HLR 110 starts to run. Here, cutover refers to migrating data from one place to another.

For the sake of reducing coupling of different master HLRs' data in the redundant center HLR 110, each master HLR 101 has been designated a master HLR identity in the redundant center HLR 110 in this embodiment. Thus, different master HLR identities are used to guarantee the data independence of different master HLRs 101, and facilitate the maintenance for the redundant center HLR 110. When performing cutover for the subscribers' data, the redundant center HLR 110 loads subscribers' data of different master HLRs 101 into the host machine of the redundant center HLR 110 respectively according to the identities of different master HLRs.

Here, the communication module 111 is realized by adopting a File Transfer Protocol (FTP) communication module, or a SOCKET communication module. Each of the master HLRs 101 carries out data transmission with the redundant center HLR 110 via a Wide Area Network (WAN), and the mode of data transmission can be Digital Data Network (DDN), X.25 or E1. The communication module 111 employs a traditional method in the industry to fetch the log files periodically from the open lists of the N master HLRs 101, which are saved as text files and contain operation & maintenance commands. Also, the communication module 111 can send an instruction to the master HLRs 101 for getting the operation & maintenance commands, the master HLRs obtain the log files saved in themselves and return them to the communication module 111 after receiving the instruction. After receiving the log files, the communication module 111 adds different master HLR identities to different log files of the master HLRs 101, and sends the log files with the master HLR identities to the maintenance log converting module 112.

The maintenance log converting module 112 analyzes the log files, and converts operation & maintenance commands into internal operation commands recognizable by the redundant center HLR according to operated subscriber number, type of the operation command, operation content and operating result. When performing conversion for the operation & maintenance commands, reserve the master HLR identities and send the converted internal operation commands to the internal command loading module 1113 according to the different master HLR identities.

Due to the variety of operation logs for different manufacturers, one master HLR 101 corresponds to one maintenance log converting module 112 in this embodiment, and each maintenance log converting module 112 is responsible for converting the successfully executed maintenance commands of certain manufacturer format, which are associated with system data and subscribers' data of the master HLRs, into the internal operation commands recognizable by the redundant center HLR 110. Although different master HLRs 101 made by same manufacturers can share a maintenance log converting module 112, this embodiment provides a maintenance log converting module 112 for each master HLR 101 correspondingly for the facility of performance.

The internal command loading module 113 loads the internal operation commands into the host machine of the redundant center HLR 110 according to different master HLR identities, and the host machine can distinguish the data of different HLRs in terms of different master HLR identities.

The data redundancy method of this embodiment includes two procedures:

Firstly, perform cutover for subscribers' data. The redundant center HLR of this embodiment performs cutover for the subscribers' data from the master HLRs, with reference to cutover mode of subscribers' data in the HLR of the existing network, to itself before it starts to run, i.e., it will build up an initial subscribers' data baseline for the redundancy system. Because the operation of migrating subscribers' data among the HLRs in the network is one of routine engineering without technical issues, it will not be discussed further. The redundant center HLR adds different master HLR identities into the subscribers' data migrated from different master HLRs.

Figure 2:
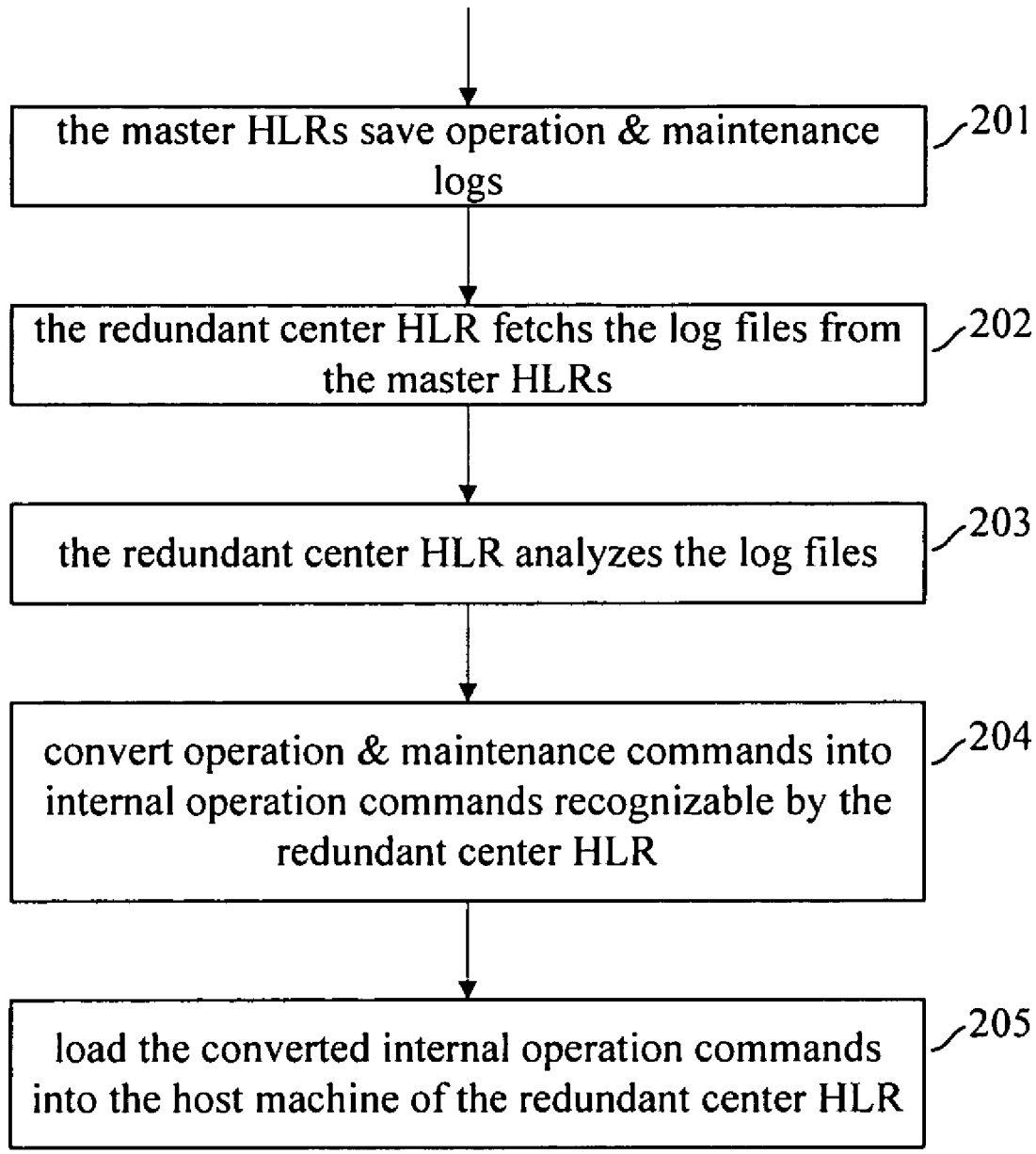
FIG. 2 is a flowchart illustrating the synchronous procedure for operation & maintenance commands of the embodiment shown in FIG. 1.

Secondly, synchronize the operation & maintenance commands. Referring to FIG. 2, which is a flowchart illustrating the synchronous procedure for operation & maintenance commands of the embodiment shown in FIG. 1, the procedure comprises the following steps:

Step 201: The master HLRs save all successfully executed operation & maintenance commands in regard to subscribers' data and system data of the host machine of the master HLRs in a fixed log format under a designated list.

Step 202: The redundant center HLR employs a traditional method in the industry to fetch the log files periodically from the open lists of the N master HLRs which are saved as text files and contain operation & maintenance commands. Also, an instruction can be sent to the master HLRs for transferring operation & maintenance commands. After receiving the instruction, the master HLRs obtain the log files saved in themselves and return them to the redundant center HLR. At the same time, the redundant center HLR adds different master HLR index identities to the received different log files of the master HLRs.

Step 203: The redundant center HLR analyzes the log files, and reads the operation & maintenance commands from the files.

Step 204: According to operated subscriber number, type of the operation command, operation content and operating result of the operation & maintenance commands in the log files, convert operation & maintenance commands into internal operation commands recognizable by the redundant center HLR. When performing conversion for the operation & maintenance commands, keep the master HLR identities and send the converted internal operation commands to the internal command loading module 113 according to the different master HLR identities.

Step 205: Load the converted internal operation commands into the host machine of the redundant center HLR, respectively, according to different master HLR identities.

In this way, the redundant center HLR will have a backup for all the static data of the N operating master HLRs in its redundancy area.

In the event of a malfunction for anyone of the N operating master HLRs, the redundant center HLR will use the backup static data saved locally in the failed master HLR to perform signaling switchover, and provide services such as roaming and calling to the subscribers of the failed master HLR. The above is a service redundancy procedure, and can be achieved with the service redundancy method of the prior art.

As seen from the above embodiment, the data redundancy method for the HLR of the present invention ensures all the increased service data between the redundant center HLR and the master HLRs to be synchronized automatically. Thus, it enhances the conformity of the subscribers' data between the master HLRs and the redundant center HLR, and reduces the maintenance workload of the redundant center HLR and lowers the maintenance complexity.

The invention claimed is:

1. A method of providing data redundancy for a Home Location Register (HLR), comprising the steps of:
    performing cutover for subscribers' data from more than one master HLRs to a redundant center HLR, respectively;
    preserving all successfully executed operation and maintenance commands which are associated with system data and said subscribers' data of the more than one master HLRs during operation of the master HLRs;
    transferring said operation and maintenance commands preserved in the more than one master HLRs to the redundant center HLR;
    converting the operation and maintenance commands into internal operation commands recognizable by the redundant center HLR, and loading the internal operation commands into a host machine of the redundant center HLR;
    wherein
    the operation and maintenance commands in the master HLRs are preserved as log files;
    said step of transferring the operation and maintenance commands comprises: transferring the log files containing the operation and maintenance commands;
    wherein
    said step of converting the operation and maintenance commands comprises: analyzing the received log files containing the operation and maintenance commands, and converting the operation and maintenance commands into internal operation commands recognizable by the redundant center HLR according to operated subscriber number, type of the operation command, operation content and operating result in the log files.

2. The data redundancy method according to claim 1, wherein the method further comprises:
    setting a distinct master HLR identity for each of the master HLRs, respectively; and adding the master HLR identities to the subscribers' data and the received operation and maintenance commands by the redundant center HLR;
    said performing cutover for the subscribers' data comprises: loading the subscribers' data from different master HLRs to the host machine of the redundant center HLR according to the different master HLR identities, respectively;
    said converting and loading the commands comprises: reserving the master HLR identities when converting operation and maintenance commands by the redundant center HLR, and loading the converted internal operation commands, respectively, into the host machine of the redundant center HLR in terms of the different master HLR identities.

3. The data redundancy method according to claim 1, wherein the method of transferring the operation and maintenance commands comprises: the redundant center HLR periodically fetches the log files containing the operation and maintenance commands from the open list of the master HLR.

4. The data redundancy method according to claim 1, wherein the method of transferring the operation and maintenance commands comprises: the redundant center HLR gives an instruction to the master HLR for transferring the operation and maintenance commands, the master HLR gets the log files saved in itself after receiving the instruction, and returns the log files to the redundant center HLR.

5. The data redundancy method according to claim 1, wherein the master HLRs and the redundant center HLR transfer said operation and maintenance commands via a Wide Area Network (WAN).

6. The data redundancy method according to claim 5, wherein the master HLRs and the redundant center HLR transfer said operation and maintenance commands via a Digital Data Network (DDN), or in a X.25 Protocol mode, or in a E1 mode.

7. The data redundancy method according to claim 1, wherein the master HLRs and the redundant center HLR transfer said operation and maintenance commands in a File Transfer Protocol (FTP) or a SCOKET mode.

8. A method of providing data redundancy for Home Location Register (HLR), comprising:
    performing cutover for subscribers' data preserved in more than one master HLRs into a redundant center HLR, responsively;
    obtaining, by a redundant center HLR, successfully executed operation and maintenance commands which are associated with system data and subscribers' data of more than one master HLRs, respectively, during operation of the master HLRs;
    converting the operation and maintenance commands into internal operation commands recognizable by the redundant center HLR;
    loading the internal operation commands into a host machine of the redundant center HLR; wherein
    the method further comprises: setting a distinct master HLR identity for each of the more than one master HLRs, respectively; and adding the master HLR identities to the subscribers' data and the received operation and maintenance commands by the redundant center HLR;
    said step of performing cutover for the subscribers' data comprises: loading the subscribers' data from different master HLRs to the host machine of the redundant center HLR according to the different master HLR identities, respectively;
    said step of converting and loading the commands comprises: reserving the master HLR identities when converting operation and maintenance commands by the redundant center HLR, and loading the converted internal operation commands, respectively, into the host machine of the redundant center HLR in terms of the different master HLR identities.

9. The data redundancy method according to claim 8, wherein the operation and maintenance commands in the more than one master HLRs are preserved as log files;

and said obtaining the operation and maintenance commands comprises obtaining the log files containing the operation and maintenance commands.

10. The data redundancy method according to claim 9, wherein the method of obtaining the operation and maintenance commands comprises: the redundant center HLR periodically fetches the log files containing the operation and maintenance commands from an open list of each of the more than one master HLRs.

11. The data redundancy method according to claim 9, wherein the method of obtaining the operation and maintenance commands comprises: the redundant center HLR gives an instruction to each of the more than one master HLRs for transferring the operation and maintenance commands, each of the more than one master HLRs gets the log files saved in itself after receiving the instruction, and returns the log files to the redundant center HLR.

12. A system of providing data redundancy for Home Location Register (HLR), comprising: more than one master HLRs redundant center HLR;

each of the master HLRs is adapted to perform cutover for subscribers' data preserved in itself into the redundant center HLR, and preserve successfully executed operation and maintenance commands which are associated with system data and the subscribers' data of the master HLRs during operation of the master HLRs; and the redundant center HLR is adapted to obtain the operation and maintenance commands from each of the more than one master HLRs, respectively, convert the operation and maintenance commands into internal operation commands recognizable by the redundant center HLR, and load the internal operation commands into a host machine of the redundant center HLR; wherein each of the more than one master HLRs is assigned a distinct master HLR identity; and the redundant center HLR is further adapted to add the master HLR identities to the subscribers' data and the received operation and maintenance commands, load the subscribers' data from different master HLRs to the host machine of the redundant center HLR according to the different master HLR identities, respectively, reserve the master HLR identities when converting operation and maintenance commands, and load the converted internal operation commands, respectively, into the host machine of the redundant center HLR in terms of the different master HLR identities.

* * * * *

UNITED STATES PATENT AND TRADEMARK OFFICE
CERTIFICATE OF CORRECTION

PATENT NO.         : 7,657,260 B2                                           Page 1 of 1
APPLICATION NO.    : 11/431890
DATED              : February 2, 2010
INVENTOR(S)        : Guangbin Meng It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 772 days.

Signed and Sealed this

Thirtieth Day of November, 2010

David J. Kappos
*Director of the United States Patent and Trademark Office*